United States Patent [19]

Wetzel

[11] 4,088,506
[45] May 9, 1978

[54] PROCESS FOR PREPARING PIGMENTARY QUINACRIDONE USING LOW-SALT MILLING

[75] Inventor: Roland Herman Wetzel, Landenburg, Pa.

[73] Assignee: E. I. Du Pont de Nemours and Company, Wilmington, Del.

[21] Appl. No.: 787,995

[22] Filed: Apr. 15, 1977

Related U.S. Application Data

[63] Continuation-in-part of Ser. No. 748,768, Dec. 8, 1976, abandoned.

[51] Int. Cl.² ............................................. C08J 3/00
[52] U.S. Cl. ............................... 106/288 Q; 106/309
[58] Field of Search ........................... 106/288 Q, 309; 260/279

[56] References Cited

U.S. PATENT DOCUMENTS

| 3,030,370 | 4/1962 | Jackson | 106/288 Q |
|---|---|---|---|
| 3,980,488 | 9/1976 | Barrington et al. | 106/309 |

Primary Examiner—Winston A. Douglas
Assistant Examiner—J. V. Howard

[57] ABSTRACT

Process for converting crude quinacridone to pigmentary form by milling crude quinacridone in the presence of from 5% to 50% by weight of aluminum sulfate, based on the weight of the crude quinacridone. The resulting quinacridone exhibits high masstone transparency in coating compositions.

3 Claims, No Drawings

PROCESS FOR PREPARING PIGMENTARY QUINACRIDONE USING LOW-SALT MILLING

CROSS-REFERENCE TO RELATED APPLICATION

This application is a continuation-in-part of copending application Ser. No. 748,768, filed Dec. 8, 1976, now abandoned.

BACKGROUND OF THE INVENTION

This invention is directed to a process for converting crude quinacridone to pigmentary form and, more particularly, to an improved process employing relatively low levels of inorganic salt.

It is well known in the art that quinacridones direct from synthesis, known as crude quinacridones, are unsuitable for many pigmentary uses and must be further processed to develop appropriate pigmentary properties, e.g., particle size, strength, phase, etc. The most commonly used processes for converting curde quinacridone to pigmentary form involve milling the crude quinacridone with large quantities of inorganic salt, e.g., from 150% to 900% based on pigment weight, then acid extracting the resulting quinacridone pigment. While the salt-grinding process can produce satisfactory pigment, the total volume of the grinding elements and salt is so large that only a relatively small amount of pigment can be milled for each batch. Furthermore, disposal of the large amounts of salt solution which results from the extraction step creates potential pollution problems and adds considerably to the manufacturing costs of the pigment.

An early attempt to eliminate the high salt levels traditionally thought to be required in the processing of quinacridone, described in U.S. Pat. No. 2,857,400, involved milling crude quinacridone without salt and contacting the milled quinacridone with an organic liquid to promote development of pigmentary properties. This method was later improved by the discovery that the quinacridone could be contacted with an organic liquid in water emulsion, as described in U.S. Pat. No. 3,017,414.

While the quinacridone pigments prepared by the salt-free processes are satisfactory for a variety of applications where pigment masstone is not particularly critical, in applications requiring particularly dark masstones, such as automotive finishes, the masstone often is insufficiently dark.

This invention provides for an improved process for converting crude quinacridone to pigmentary form whereby the dark masstone characteristic of salt-milling processes is achieved while salt pollution is minimized.

SUMMARY OF THE INVENTION

In accordance with the invention there is provided an improved process for converting crude quinacridone to pigmentary form by dry milling the crude quinacridone, contacting the milled quinacridone with an organic liquid in water emulsion, and recovering the quinacridone in pigmentary form. The improvement resides in dry milling the crude quinacridone in the presence of from 5% to 50% by weight, and preferably from 10% to 40% by weight, of aluminum sulfate, based on the weight of crude quinacridone. For the highest quality pigment hydrated aluminum sulfate is most preferred.

DETAILED DESCRIPTION OF THE INVENTION

The term "quinacridone" as used herein is intended to include unsubstituted and substituted quinacridones and mixtures and solid solutions thereof, of the type described, for example, in U.S. Pat. Nos. 2,844,484, 2,844,485, 2,821,530, 2,844,581 and 3,160,510.

With the primary exception of the use of a relatively small amount of aluminum sulfate in the dry milling of crude quinacridone, the milling operation is similar to that described in U.S. Pat. No. 3,017,414. Dry milling, as used herein, means milling in the complete absence of liquids or, if liquids are used, such as phase directing solvent or a surface-active agent, they are present in such small amounts that the mill charge retains the characteristics of a dry powder. For example, the dry milling of crude quinacridone is generally conducted using inert grinding elements, such as steel rods, balls, nails, etc., and, optionally, a small quantity of surfactant. The mill charge of grinding elements usually occupies about half the volume of the mill and the crude quinacridone to be milled and, in the case of this invention, the aluminum sulfate generally at least fills the voids between these elements or may be considerably more to the point that the total charge in the mill is in the range of 60% to 65% of the total volume of the mill.

The milling time will vary depending upon the particular quinacridone being milled, the mill loading, and the type of mill being used. A minimum of four to six hours is usually required, and this may be extended to 12 to 18 hours particularly for amounts of inorganic salt in the lower part of the range taught herein, e.g., 5% to 20% by weight, based on the weight of the crude quinacridone.

The milled pigment is then treated with an organic liquid in water emulsion. Other than the choice of a preferred class of surfactants as components of the organic liquid in water emulsion, the choice and amount of organic liquid is similar to that known in the art. Useful organic liquids include chlorinated aliphatic hydrocarbons, unsubstituted aromatic hydrocarbons, chlorinated aromatic hydrocarbons, nitobenzene, benzonitrile, and mixtures of these liquids. Tetrachloroethylene is a preferred chlorinated aliphatic hydrocarbon, whereas benzene and xylene are examples of preferred aromatic hydrocarbons, and monochlorobenzene and o-dichlorobenzene are preferred chlorinated aromatic hydrocarbons. The amount of organic liquid should be at least 30% by weight, based on the weight of the crude quinacridone, and in general 100% by weight is preferred. The ratio of water to the organic liquid is not critical as long as there is sufficient water present to produce a fluid slurry.

In the practice of this invention, the preferred surface active agent or surfactant is an anionic surfactant, specifically the amine salt of dodecyl benzene sulfonic acid. From 1% to 10% by weight of this surfactant, based on the weight of the crude quinacridone, should preferably be present in the organic liquid in water emulsion. It is further preferred that from 2% to 5% by weight of this surfactant, based on the weight of the crude quinacridone, be present during the milling of the crude quinacridone. In any event, the total amount of surfactant should preferably be from 3% to 15% by weight, based on the weight of the crude quinacridone.

After contacting the dry milled quinacridone with the organic liquid in water emulsion, the temperature of the resulting slurry should preferably be at least 75° C., and more preferably from 90° to 97° C. The organic liquid in water emulsion can be heated to at least 50° C. prior to forming the slurry, if desired, to decrease or eliminate heat-up time after slurry formation. Higher temperatures are unnecessary, and boiling the slurry should be avoided for reasons of safety. The duration of contact at temperature can vary depending upon the particular premilled quinacridone being treated, but usually ranges from 30 minutes to 10 hours, and preferably from one to two hours.

After completion of the contact with the organic liquid in water emulsion, the quinacridone can be isolated or further processed in the conventional manner. Since the dry milled quinacridone is commonly milled using iron or steel grinding elements, iron filings are usually present in the premilled quinacridone. Consequently to remove the iron filings the slurry should be acidified prior to isolation or further processing of the pigment. The common practice involves adding sufficient acid to provide from 0.5% to 2% by weight of acid calculated as sulfuric acid and based on the weight of the acidified slurry. The acidified slurry is preferably held at a temperature of at least 85° C. from 30 minutes to two hours to insure dissolution of any iron which may be present.

The quinacridone pigment prepared according to the invention can be subjected to a variety of treatments, depending on the end-use and specific properties desired. For example, as described in U.S. Pat. No. 3,386,843, the quinacridone pigment can be contacted with quinacridone monosulfonic acid while still in slurry form, after which a metal salt is added to the slurry to form a composition containing the quinacridone pigment and the metal salt of quinacridone sulfonic acid. Another treatment commonly used to increase transparency in paints, involves mixing the quinacridone in aqueous slurry with a small quantity of antiflocculating agent.

The quinacridone pigment can conveniently be recovered from the slurry by filtration, washing, and drying. The quinacridone pigment can be used without further processing or, if desired, can be pulverised, with or without extender pigments, such as nickel carbonate, prior to use.

The quinacridone pigment prepared in accordance with the invention exhibits pigmentary properties which are at least equal to quinacridone pigment prepared by conventional high-salt milling, without the high cost and pollution problems associated with high-salt usage.

The following examples illustrate the invention.

EXAMPLE 1

The following ingredients were milled in a one-quart can for ten hours at a can surface speed of 97 ft/min: 15 g of crude unsubstituted quinacridone, 7.5 g of hydrated aluminum sulfate (50% by weight based on quinacridone), and 1650 g of steel grinding elements. The milling procedure was repeated to provide two batches of mill powder. The steel grinding elements were separated from the mill powder by pouring the entire mill charge through an eight-mesh screen.

An organic liquid in water emulsion was prepared by mixing 480 g of water, 25 g of tetrachloroethylene, 2.5 g of a commercially available anionic amine salt of dodecyl benzene sulfonic acid, and 20 g of a 50% aqueous solution of sulfuric acid. The emulsion was heated to 70° C. and 34.8 g of the mill powder prepared above was added with stirring to the emulsion. The resulting slurry was then heated to 90° ± 3° C. and maintained within that temperature range for two hours.

The slurry was steam distilled to remove the tetrachloroethylene. Then the slurry was filtered and the product was washed acid-free with water, oven dried and pulverized.

When this pigment was tested by rubout on a Hoover muller in lithographic varnish (a well-known and conventional test for the tinctorial properties of colored pigments), it was found to have much darker masstone that the same unsubstituted quinacridone prepared in the same way without the 7.5 g of hydrated aluminum sulfate. In addition, the masstone is comparable in darkness to a commercially available unsubstituted quinacridone prepared by the conventional high-salt milling followed by treatment with organic liquid in water emulsion.

EXAMPLES 2-6

The procedure of Example 1 is followed except that instead of 7.5 g or 50% by weight of hydrated aluminum sulfate, 5.9 g or 39.4% by weight (Example 2), 3 g or 20% by weight (Example 3), 2 g or 13.3% by weight (Example 4), 1.5 g or 10% by weight (Example 5), and 0.75 g or 5% by weight (Example 6) of hydrated aluminum sulfate were used.

All the pigments exhibited a darker masstone than the unsubstituted quinacridone prepared without hydrated aluminum sulfate. The least darkness improvement was exhibited by the pigment of Example 6 and the most improvement was exhibited by the pigment of Example 2. Amounts of hydrated aluminum sulfate less than 5% by weight failed to provide acceptable masstone darkness.

What is claimed is:

1. In a process for converting crude quinacridone to pigmentary form by dry milling the crude quinacridone, contacting the milled quinacridone with an organic liquid in water emulsion, and recovering the quinacridone in pigmentary form, the improvement comprising dry milling the crude quinacridone in the presence of from 5% to 50% by weight of aluminum sulfate, based on the weight of the crude quinacridone.

2. Process for converting crude quinacridone to pigmentary form according to claim 1 wherein the aluminum sulfate is in an amount from 10% to 4% by weight, based on the weight of the crude quinacridone.

3. Process for converting crude quinacridone to pigmentary form according to claim 2 wherein the aluminum sulfate is hydrated.

* * * * *

UNITED STATES PATENT OFFICE
CERTIFICATE OF CORRECTION

PATENT NO. : 4,088,506
DATED : May 9, 1978
INVENTOR(S) : ROLAND HERMAN WETZEL

It is certified that error appears in the above-identified patent and that said Letters Patent are hereby corrected as shown below:

Column 4, line 56, "10% to 4%" should read --10% to 40%--.

Signed and Sealed this

Nineteenth Day of September 1978

[SEAL]

Attest:

RUTH C. MASON
Attesting Officer

DONALD W. BANNER
Commissioner of Patents and Trademarks